INVENTOR.
DALE E HILL 3,113,210
NEUTRON DETECTOR OF CRYSTALLINE
BORON PHOSPHIDE
Dale E. Hill, Dayton, Ohio, assignor to Monsanto Chemical Company, St. Louis, Mo., a corporation of Delaware
Filed Oct. 27, 1960, Ser. No. 65,536
18 Claims. (Cl. 250—83.1)

The present invention relates to devices for the detection and measurement of various types of radiation and particles, and in particular, the detection of neutrons.

It is an object of the invention to provide radiation and particle detectors and particularly neutron detectors having a sensing component which has qualities of thermal stability hitherto unknown in prior art devices.

More particularly, this invention relates to the use of new compositions of matter as the sensing element in said devices. The invention contemplates the use of crystalline rhombohedral boron phosphides having a boron-to-phosphorus ratio of at least 6 to 1 as the sensing element. The preferred compositions of matter within the above range are those having formulae of from $B_6P$ to $B_{20}P$ and more preferably the stoichiometric compound hexaboron phosphide having the formula $B_6P$.

The novel forms crystalline boron phosphide recited above may be prepared by a chemical reaction between elemental boron and elemental phosphorus, by thermal decomposition of boron phosphide having the formula BP, by the reaction of BP with elemental boron, by the reaction of elemental boron with the compound phosphine, $PH_3$, or by the reaction of a phosphorus source such as ferrophosphorus or crude phosphate ore, and with a boron source such as elemental boron, crude borax or other boron compound, in the presence of a reducing agent such as carbon.

While the above-described methods may be used to prepare any of the crystalline boron phosphides within the above ratios, they are particularly desirable for preparing the stoichiometric compounds $B_6P$. However, the more preferred method for preparing higher boron phosphides, that is, those above $B_6P$, consists of heating the compound $B_6P$ under specific conditions set forth hereinafter. This method is preferred because it is susceptible to more accurate means of control for obtaining specific higher boron phosphide compositions than are the earlier named methods for obtaining the same compositions.

Figure 1:
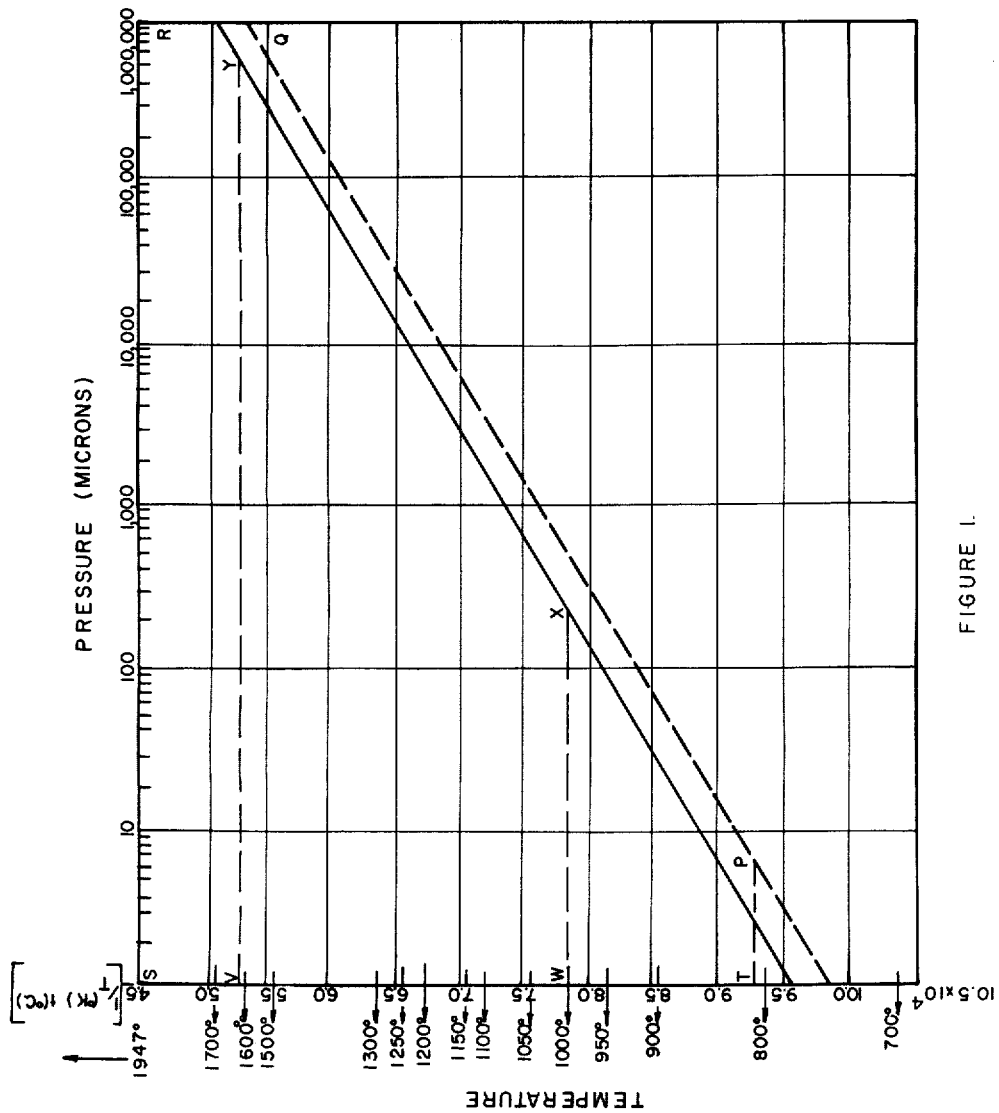
FIGURE 1 represents the equilibrium pressure-temperature conditions which are necessary for the formation of $B_6P$.

FIG. 1 shows the equilibrium process operating region which has been found to yield the product $B_6P$. This is the range of phosphorus pressure below the line PQR (area PQRST where R and Q are intercepts on the 1,000,000 micron pressure line) and preferably below the line XY (area VWXY). The lower limit of this operating range is the pressure one micron. The broader operating temperature range for the product of these boron phosphides is, as shown in FIG. 1, from 800° C. to 1947° C., the preferred range being from 1000° C. to 1600° C. The pressure range is from 1 to one million microns, the preferred range being represented by the line XY.

In general, as is shown in the upper line of FIG. 1, the operating pressure which yields the desired $B_6P$ instead of BP is in the region below the line PQ. Thus, at 1000° C., a pressure of 100 microns gives $B_6P$ while a pressure of 1570 microns gives BP.

It should be noted, however, that higher boron phosphides, i.e., those having a boron-phosphorus ratio greater than 6 to 1, are also obtained within the $B_6P$ region described in FIG. 1 under non-equilibrium conditions, with the limitation that the partial pressure of phosphorus is less than the decomposition pressure of the compound BP at ambient temperatures. Equilibrium graphs for the higher boron phosphides are similar within the temperature range of 800° C. to 2100° C. and pressures of from 1 micron to 100 atmospheres.

A more preferred method for obtaining the higher boron phosphides consists of heating $B_6P$ under specific conditions set forth hereinafter. This method is based upon the fact that when $B_6P$ (or other higher boron phosphide) is heated under controlled conditions, phosphorus is evolved continuously until a definite weight percent loss of the original sample is noted. This weight percent loss is specific for each boron phosphide and is an accurate means for obtaining any desired higher boron phosphide.

Specific examples showing the preparation of the crystalline boron phosphide $B_6P$ are given below:

*Example 1*

The transformation of the simple form of boron phosphide having the formula, BP, to the crystalline form having the formula, $B_6P$, was conducted by placing 100 g. of boron phosphide in finely-divided form in a graphite crucible in a porcelain tube located in an electric furnace. The porcelain tube was connected to a vacuum system which could be maintained at 50 microns pressure. The electric furnace was brought up to a temperature of 1200° C. and maintained constant. It was found that the evolution of phosphorus during a 12 hour period yielded a residual product having the formula $B_6P$. Another experiment utilizing this method gives a product analyzing $B_{6.5}P$. It was also found that the starting material could be either amorphous BP or be cubic crystalline form of boron phosphide with the production of the same ultimate products.

The critical consideration required for the transformation of BP to $B_6P$, as well the general criterion for the production of higher boron phosphide compositions is that the system be operated such that the partial pressure of phosphorus be less than that of the decomposition pressure of boron phosphide at the ambient temperature. In the present example the operating pressure of the furnace and the temperature at which it is maintained were such that the transformation of BP to $B_6P$ was aided by permitting the evolved phosphorus resulting from the dissociation to be removed from the reaction zone (by means of the vacuum collecting system). The temperature in the phosphorus collection zone was maintained at a relatively low value by the use of a water condenser, e.g., the pressure of the phosphorus source which was thus lower than the dissociation pressure of phosphorus over the product, thus allowing the desired reaction to proceed.

After the processing described above, the product having the approximate formula $B_6P$ was found to be a gray powder of unusual hardness. It was found that the gray powder was harder than silicon carbide, and had a hardness on the Moh scale between 9.0 and 9.7.

Repetition of the above method using a temperature of 1200° C. is found to result in the production of a similar $B_6P$ product, as is the case when the BP is mixed with an excess of elemental boron (5 molar weight proportion relative to the BP).

Example 2

Reaction of elemental boron with elemental phosphorus for the production of $B_6P$ was carried out by charging 0.4176 g. of amorphous boron into a graphite crucible which had been prepared by drilling a 5/16" hole in a cylindrical piece of 1/2" graphite rod. The charged crucible was placed into a 3/4" O.D. ceramic tube 10" long, closed at the end nearest the sample. One-half of the ceramic tube was located in a high temperature furnace, while the other end was placed in an adjacent low temperature furnace, without any cold zone between the two furnaces. The other end of the ceramic tube was then charged with 1.976 g. of amorphous red phosphorus, after which the tube was evacuated and sealed.

The tube was located in the two adjacent furnaces which were then gradually brought up to the desired temperature. The hot end was maintained at a temperature of 1100° C., while the temperature of the phosphorus end was maintained at 111° C. to volatilize the phosphorus and to maintain a phosphorus partial pressure of about 1000 microns.

The heating of the reaction system caused the phosphorus to vaporize with the result that the phosphorus vapor filled the entire tube at the desired pressure. The phosphorus vapor then reacted with the hot boron contained at the other end of the tube. It was found that at the end of the heating period of about 24 hours, that the boron had been transformed substantially completely to the compound $B_6P$. A similar experiment conducted at 1200° C. was also found to give a substantially quantitative yield of $B_6P$. In general, as is shown in the curve of FIG. 1, the operating pressure which yields the desired $B_6P$ instead of BP is in the region below the line XY. Thus, at 1000° C. the pressure of 100 microns gives $B_6P$, while a pressure of 1570 microns gives BP.

In the present example the use of a shaped charge of starting material, that is, the boron located in the drilled cavity in the graphite crucible, resulted in the production of a similar and identically shaped product of $B_6P$.

The $B_6P$ product was found to have a bulk density of 2.45. However, the ultimate density of individual homogeneous particles varies between 2.60 and 2.72. In contrast, cubic BP has a theoretical X-ray density of 2.97.

In this example, as in the preceding example, the condition for the formation of $B_6P$, or more generally, all boron phosphides herein described, is that the system be operated such that the partial pressure of phosphorus is less than that of the decomposition pressure of BP at the ambient temperature.

The higher boron phosphides are prepared in accordance with this method, for example, by adding to 67.65 grams of elemental boron sufficient phosphorus to form the desired higher boron phosphide. For example, 9.6 g. of phosphorus reacted with the above quantity of boron produces $B_{20}P$, 4.84 g. of phosphorus produces $B_{40}P$, 2.76 g. produces $B_{70}P$ and only 1.94 g. of phosphorus produces $B_{100}P$.

Example 3

The production of the compound $B_6P$ from boron phosphide reacted with excess elemental boron was carried out at a series of temperatures above 1000° C. The boron phosphide was employed as a finely-divided crystalline powder, while the boron was also in a finely-divided form of less than 100 mesh particle size. The two components were mixed and charged to a graphite crucible having an internal and external element which fitted loosely together with the space between the two portions forming a nose cone such as was adaptable for use in a rocket. The intimately mixed combination of boron phosphide and elemental boron (5 moles of boron per mole of boron phosphide) was heated to a temperature of 1200° C. for a period of 12 hours in an inert gas atmosphere. At the end of this time the charged crucible was cooled and the test piece removed. It was found that the boron phosphide had been transformed substantially completely to a crystalline $B_6P$ product which was very hard and which could be subjected to oxidizing or reducing flames without substantial deterioration.

This same procedure is followed to obtain the higher boron phosphide by increasing proportionately the amount of elemental boron required to react with the boron phosphide, BP, to obtain the desired boron-phosphorus ratio.

Example 4

The formation of $B_6P$ by the reaction of boron trichloride as the boron source and elemental phosphorus as the phosphorus source in the presence of hydrogen was carried out by introducing the respective zones into a reactor from the respective gas phases. The elemental phosphorus was provided by bubbling a stream of hydrogen through a heated pool of phosphorus, yellow form. The gas, heated with phosphorus, was directed into a heated reaction vessel, into which gaseous boron trichloride was also flowing. At temperatures of 1100° C. the reaction between the boron trichloride and the phosphorus results in the formation of the crystalline product $B_6P$. However, it is essential that the conditions be such that the partial pressure of phosphorus be less than that of the decomposition pressure of BP at the ambient temperature.

Regardless of the method of preparation utilizing one of the procedures set forth above, the compound $B_6P$ is obtained as the product. The compound $B_6P$ has been found to exist in a crystalline form.

This same procedure is followed to obtain the higher boron phosphides by increasing proportionately the amount of boron trichloride required to supply free boron sufficient to react with elemental phosphorus to obtain the desired boron-phosphorus ratio.

The preferred method of preparation of the higher boron content boron phosphides of the present invention will now be described. In the instant illustration, hexaboron phosphide is heated to a temperature within the range of from 800° C. to 2100° C. at pressures within the range of from 1 micron to 100 atmospheres until the desired boron phosphide is produced, as determined by a measurement of the accumulated weight percent loss of the hexaboron phosphide sample. At a given temperature, when the sample has lost a specified weight the boron-phosphorus ratio for that weight loss represents the composition of the resultant boron phosphide.

There are several methods available for continuously measuring the weight loss of the sample, the more common ones being by use of a quartz spring balance in conjunction with a cathetometer, a simple balance or a strain gauge. These devices are commercially available.

The following examples illustrate specific embodiments of the preferred method for obtaining the higher boron phosphides, the weighing device in each case is a quartz spring balance:

Example 5

A sample of hexaboron phosphide, $B_6P$, having a boron content of 67.7 weight percent and weighing 0.768 g. was placed in a graphite container. The graphite container was then suspended to a coiled quartz spring attached to the inside of a quartz container which enclosed both the quartz spring and graphite container and which also had openings for the introduction of an inert gas into and out of the quartz container and a vacuum seal. The hexaboron phosphide sample was heated to 1525° C. by means of a platinum wire furnace surrounding that portion of the quartz container was located, while the upper portion of the quartz container in which the quartz spring was located and the lower portion of the quartz container below the graphite container was heated to 600° C. with ordinary furnaces. Argon was then introduced into the quartz container at 1 atmosphere pressure and at a flow rate of about 7.5 cc./min. Heating of the hexaboron phosphide sample was continued for 8 minutes at which time it was noted, by means of a cathetometer reading on an indicator located on the quartz spring, that the sample had lost 12.91 weight percent. The sample was immediately cooled and analyzed. The product had 77.74 weight percent boron and 22.26 weight percent phosphorus, corresponding to a boron phosphide having the formula $B_{10}P$.

*Example 6*

The same procedure as described in Example 5 was followed except that the heating was continued for 100 minutes. A cathetometer reading indicated a weight percent loss of 22.61. The product was found to contain 87.48 weight percent boron and 12.52 weight percent phosphorus, corresponding to a boron phosphide having the formula $B_{20}P$.

*Example 7*

The same procedure described in Example 5 was followed but heating was continued until the product was found to have lost 30.36 weight percent phosphorous and to contain 97.216 weight percent boron and 2.784 weight percent phosphorus, corresponding to a boron phosphide having the formula $B_{100}P$.

*Example 8*

The procedure described in Example 5 was followed, but in this experiment the temperature was raised to 1595° C. In about 120 minutes the product had lost 27.45 weight percent phosphorus and again the product contained 93.32 weight percent boron and 6.68 weight percent phosphorus. The product was $B_{40}P$.

*Example 9*

The procedure described in Example 5 was again followed, but this time the heating was discontinued when the cathetometer showed a weight percent loss of 29.53. The product contained 96.07 weight percent boron and 3.93 weight percent phosphorus, corresponding to the formula $B_{70}P$. Here, again, as in Example 8, the time required to reach the desired product is greatly decreased when the temperature is increased.

It will be appreciated from the foregoing examples that a boron phosphide of any desired boron-phosphorus ratio may readily be obtained by heating hexaboron (or other higher) phosphide within the conditions herein defined until the weight loss of the hexaboron phosphide has reached a certain definite value which is typical for the several higher boron phosphides.

The materials of the instant invention have dissociation pressures of less than 100 microns at temperatures in excess of 1200° C. This is indicative of the high order of stability at elevated temperatures. For this reason, the materials of this invention are suitable for use in many devices having high temperature applications.

Figure 2:
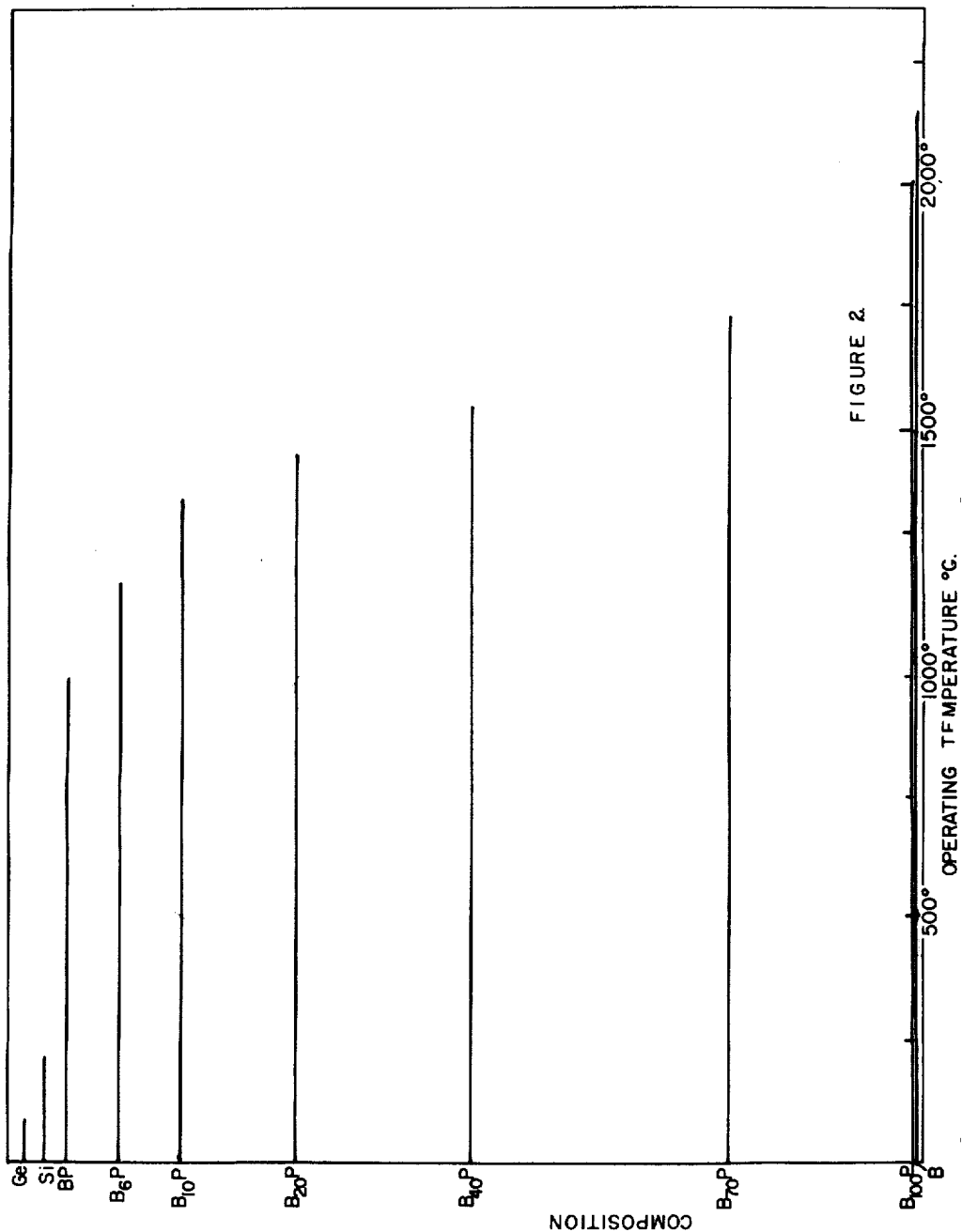
FIGURE 2 represents the approximate operating temperatures for various boron phosphides in semiconductor applications.

FIG. 2 represents the approximate operating temperatures for various boron phosphides in semiconductor applications. As noted previously, the primary advantage of these materials is their high thermal stability at high temperatures. It will be seen that the higher boron phosphides of the instant invention are clearly superior to germanium, silicon and the compound BP, particularly from the standpoint of thermal stability. At temperatures above 1000° C., boron phosphide, BP, evolves phosphorus copiously, resulting in a deleterious atmosphere of phosphorus on and around the components of the semiconductor which is corrosively destructive of the operation thereof. Coincidental with this evolution of phosphorus is a physical breakdown of the boron phosphide component due to a collapse of its cubic crystalline structure. On the other hand, the higher boron phosphides described herein are not cubic crystalline in form, hence, even when phosphorus is lost (at temperatures much higher than 1000° C.), there is no physical breakdown of the semiconductor component. Since there is much less phosphorus relative to boron in the instant boron phosphides, than in BP, there is less phosphorus to evolve into a deleterious atmosphere of phosphorus around the semiconductor components. As a consequence, the boron phosphides used herein are far superior to germanium, silicon or boron phosphide, being operable at higher temperatures for longer periods of time with less danger of corrosion and physical breakdown.

The materials of this invention can be doped by conventional means with various materials to produce the desired N- or P-type conductivity. Doping is known in this art as adding small amounts of foreign materials to change the degree and/or type of a semiconductor material by controlling the degree of electronic (or positive hole) conduction. For example, if it is desired during the process of producing the hexaboron phosphide by any of the above methods, a volatile halide of a group II–B element, magnesium or beryllium can be added to the reactants in minor amounts to give P-type hexaboron phosphide. If an N-type $B_6P$ is desired a group VI–B element can be added during the process in trace amounts. In practice, during the process of making the boron phosphide, whether doping agents are added or not, sufficient impurities will normally be picked up by the $B_6P$ being formed to make it either N- or P-type. Doping of the boron phosphide, of course, can be done after the formation of the crystalline material by diffusion of the doping agent into the crystalline structure at elevated temperatures, but normally it is preferred to do the doping during the manufacture of the $B_6P$ material.

Doping the boron phosphides of the instant invention, after the formation thereof, can be carried out as follows: The boron phosphide is heated to a temperature of about 1100° C. and subjected to a trace amount of the vaporized doping element which is allowed to diffuse into the crystal. Normally, long periods of time will be required for this type of doping procedure, possibly several days or more. When it is determined that sufficient doping material has diffused throughout the crystal, the crystal is rapidly quenched, reducing the temperature to room temperature. This, of course, is the conventional diffusion and quench method used for doping semiconductor materials after the crystalline material has been made. If the material is cooled slowly, rather than being quenched rapidly, the doping agent will diffuse right out of the lattice again. Quenching traps the doping agent within the crystal.

Figure 3:
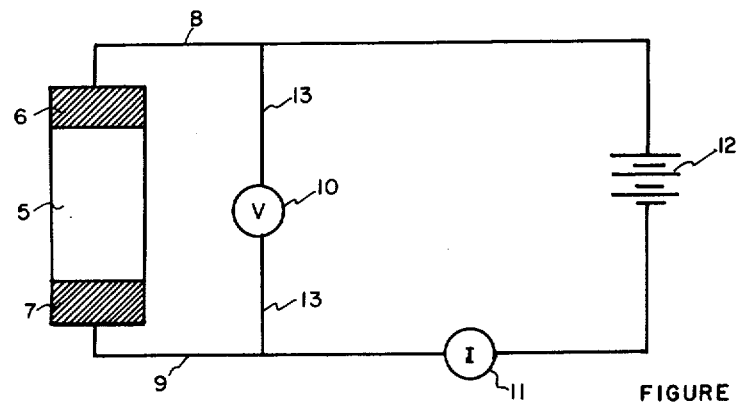
FIGURE 3 shows a device for determining both the rate and total dosage for various detectors.
Figure 4:
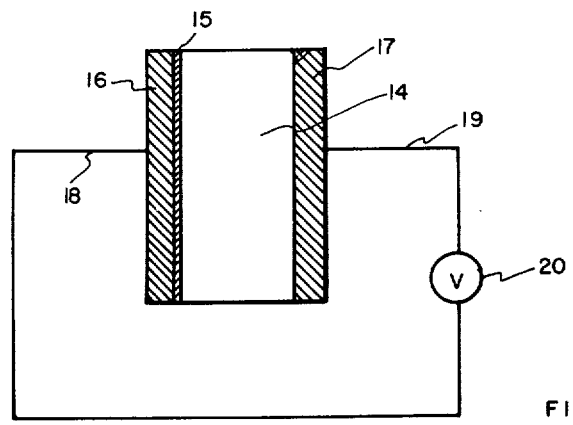
FIGURE 4 illustrates a device for determining the rate of irradiation or bombardment by various particles.
Figure 5:
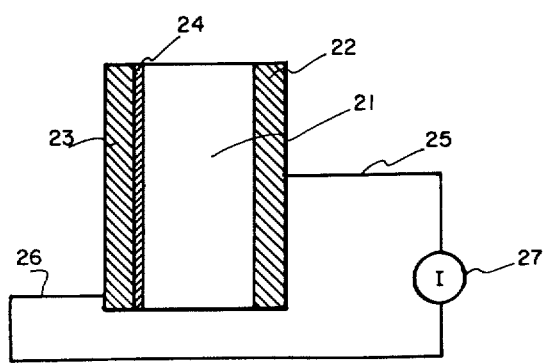
FIGURE 5 illustrates a dosimeter used to determine total accumulated dosage.

FIGS. 3 to 5 illustrate different embodiments of radiation, particle and neutron detectors using the new materials of the instant invention.

In FIG. 3 is shown a device for determining both the rate and total dosage of various detectors. Detecting component 5 comprises a crystalline boron phosphide composition of either N- or P-type conductivity, having a boron-phosphorus ratio of at least 6 to 1, preferably $B_6P$. To component 5 ohmic contact is made with conventional conductors 6 and 7, respectively, by fusing, soldering, or welding. These conductors may be copper, nickel, tungsten, molybdenum or other suitable conducting material. Electrical leads 8 and 9 are connected, by fusing, soldering or welding, to conductors 6 and 7, respectively, and to electrical current source 12. Auxiliary leads 13 connect voltmeter 10 to leads 8 and 9. Ammeter 11 is interposed in lead 9 between current source 12 and the auxiliary lead 13 connected to lead 9. When various types of radiation particles or neutrons impinge upon the crystalline $B_6P$ component 5, most of the particle energy is lost by excitation of the electrons of the $B_6P$ component. This produces an increased conductivity due to the presence of released "free" electrons. One is thereby able to measure both the rate and amount of irradiation using this device. Obviously, the measurements of rate of dosage must be made while the irradiation or bombardment is in progress. Measurements of total dosage received require a measurement of conductivity both before and after the irradiation has taken place.

FIG. 4 illustrates a device designed to determine the rate of irradiation or bombardment by various particles. Detecting component 14 comprises an N-type crystalline boron phosphide having a boron-phosphorus ratio of at least 6 to 1, preferably hexaboron phosphide, $B_6P$. Ohmic contact is made to one side of component 14 by fusing thereto a conventional conductor 17 having the same type conductivity characteristic as component 14. Ohmic contact is made to the other side of component 14 by fusing a conductor 16 having opposite conductivity characteristics than component 41, i.e., P-type conductivity. Methods for obtaining the desired conductivity type and P-N junctions are described infra. Electrical leads 18 and 19 are fused, soldered or welded to conductors 16 and 17, respectively, and are connected to voltmeter 20 which is designed for high impedance and high sensitivity. In operation this device shows how the P-N junction is used to detect radiation. When P-N junction 15 is bombarded or irradiated, the excess electrons and holes produced, according to the mechanism described above, will cause a voltage to appear across the junction. This voltage will be proportional to the rate of bombardment or irradiation.

FIG. 5 illustrates a dosimeter used to determine total accumulated dosage. Detecting component 21 comprises an N-type crystalline boron phosphide having a boron-phosphorus ratio of at least 6 to 1, preferably $B_6P$. Ohmic contact is made to component 21 by fusing thereto a conventional conductor 22 having the same type conductivity characteristics as component 21. Another ohmic contact is made to the other side of component 21 by fusing a conventional conductor 23 having opposite conductivity characteristics, i.e., P-type conductivity. These conductors may be the same as employed in the device of FIG. 4. Again, a P-N junction 24 is formed on the surface of the detecting component 21. Electrical leads 25 and 26 are fused to conductors 22 and 23, respectively, and are connected to ammeter 27 which is designed for high impedance and high sensitivity. In operation, this device shows how the P-N junction is used to detect total dosage. When radiation particles impinge upon the detecting element 21, the lattice structure of the crystalline $B_6P$ is disordered. These "lattice defects" cause large permanent changes in the electrical properties of the $B_6P$, measured at the P-N junction. The permanent damage, which is proportional to the total dosage received, is measured by measuring the maximum current produced by a given standard illumination. This maximum current decreases with increasing dosage. Thus, measurement of permanent changes of the electrical properties gives an index of the damage built up over a period of time, or the so-called dosage of bombardment.

The method of obtaining the desired N- or P-type conductivity in the conductors 16 and 23 of FIGS. 4 and 5 respectively, necessary to the formation of the P-N (or N-P) junction, is similar to that described above for the doping of $B_6P$. These conductors can suitably be iron, silver, gold, copper, nickel, tungsten, molybdenum and so forth. Incorporation of certain elements of prescribed proportions in these conductors gives rise to a specific type of conductivity. Normally, to obtain a conductor having N-type conductivity, a group VI–B element of Mendelyeev's Periodic Table is added to the metal matrix in amounts usually not greater than about 20% by weight based on the metal. P-type conductivity is achieved by adding the same amounts of a group II–B element, magnesium or beryllium to the metal matrix.

For example, to form a P-N junction on the surface of the boron phosphide, $B_6P$ (typical of the higher boron phosphides), a nickel matrix containing dispersed therein about 15% by weight of cadmium based on the nickel used as a conductor is fused, soldered or welded to the hexaboron phosphide component. The cadmium diffuses into the surface of the hexaboron phosphide, thereby forming a zone of P-type hexaboron phosphide in creating the desired P-N junction. In like manner, substitution of a group IV–B element, e.g., selenium or the cadmium gives rise to a zone of N-type hexaboron phosphide when the body of hexaboron phosphide is of P-type conductivity.

The following examples illustrate specific embodiments of the instant invention using typical crystalline boron phosphides having boron-to- phosphorus ratios of at least 6 to 1 as the detecting component:

*Example 12*

A rod of hexaboron phosphide having a resistance of $10^3$ ohms is subjected to neutron bombardment with a flux density of $10^{10}$/second. The passage of a standard voltage of 1 volt through said rod gives a current reading of $1.00 \times 10^{-3}$ amperes under controlled conditions without any neutron bombardment and a reading of $1.10 \times 10^{-3}$ amperes when subjected to neutron bombardment with a flux of $10^{10}$/second.

*Example 13*

A rod of hexaboron phosphide having a resistance of $10^3$ ohms is subjected to electron bombardment with a flux density of $10^{10}$/second. The passage of a standard voltage of 1 volt through the said rod gives a current reading of $1.00 \times 10^{-3}$ amperes under controlled conditions without any electron bombardment and a reading of $1.10 \times 10^{-3}$ amperes when subjected to electron bombardment with a flux of $10^{10}$/ second.

*Example 14*

A rod of hexaboron phosphide having a resistance of $10^3$ ohms is subjected to alpha-particle bombardment with a flux density of $10^8$/second. The passage of a standard voltage of 1 volt through the said rod gives a current reading of $1.00 \times 10^{-3}$ amperes under controlled conditions without any alpha-particle bombardment and a reading of $1.10 \times 10^{-3}$ amperes when subjected to alpha-particle bombardment with a flux of $10^8$/second.

*Example 15*

A rod of hexaboron phosphide having a resistance of $10^3$ ohms is subjected to deuteron bombardment with a flux density of $10^8$/second. The passage of a standard voltage of 1 volt through the said rod gives a current reading of $1.00 \times 10^{-3}$ amperes under controlled conditions without any deuteron bombardment and a reading of $1.10 \times 10^{-3}$ amperes when subjected to deuteron bombardment with a flux of $10^8$/second.

*Example 16*

A rod of hexaboron phosphide having a resistance of $10^3$ ohms is subjected to gamma-ray bombardment with a flux density of $10^{12}$/second. The passage of a standard voltage of 1 volt through the said rod gives a current reading of $1.00 \times 10^{-3}$ amperes under controlled conditions without any gamma-ray bombardment and a reading of $1.10 \times 10^{-3}$ when subjected to gamma-ray bombardment with a flux of $10^{12}$/second.

*Example 17*

A rod of boron phosphide having the formula $B_{40}P$, having a resistance of $10^3$ ohms, is subjected to a neutron bombardment with a flux density of $10^{10}$/second. The passage of a standard voltage of 1 volt through said rod gives a current reading of $1.00 \times 10^{-3}$ amperes under controlled conditions without any neutron bombardment and a reading of $1.12 \times 10^{-3}$ amperes when subjected to neutron bombardment with a flux of $10^{10}$/second.

Example 18

A rod of boron phosphide having the formula $B_{40}P$, having a resistance of $10^3$ ohms, is subjected to an electron bombardment with a flux density of $10^{10}$/second. The passage of a standard voltage of 1 volt through said rod gives a current reading of $1.00 \times 10^{-3}$ amperes under controlled conditions without any electron bombardment and a reading of $1.10 \times 10^{-3}$ amperes when subjected to an electron bombardment with a flux of $10^{10}$/second.

Example 19

A rod of boron phosphide having the formula $B_{40}P$ having a resistance of $10^3$ ohms is subjected to an alpha-particle bombardment with a flux density of $10^8$/second. The passage of a standard voltage of 1 volt through said rod gives a current reading of $1.00 \times 10^3$ amperes under controlled conditions without any alpha-particle bombardment and a reading of $1.10 \times 10^{-3}$ amperes when subjected to alpha-particle bombardment with a flux of $10^8$/second.

Example 20

A rod of boron phosphide having the formula $B_{40}P$ having a resistance of $10^3$ ohms is subjected to a deuteron bombardment with a flux density of $10^8$/second. The passage of a standard voltage of 1 volt through said rod gives a current reading of $1.00 \times 10^{-3}$ amperes under controlled conditions without any deuteron bombardment and a reading of $1.12 \times 10^{-3}$ amperes when subjected to deuteron bombardment with a flux of $10^8$/second.

Example 21

A rod of boron phosphide having the formula $B_{40}P$ having a resistance of $10^3$ ohms is subjected to a gamma-ray bombardment with a flux density of $10^{12}$/second. The passage of a standard voltage of 1 volt through said rod gives a current reading of $1.00 \times 10^{-3}$ amperes under controlled conditions without any gamma-ray bombardment and a reading of $1.12 \times 10^{-3}$ amperes when subjected to gamma-ray bombardment with a flux of $10^{12}$/second.

Example 22

A rod of boron phosphide having the formula $B_{100}P$ having a resistance of $10^3$ ohms is subjected to a neutron bombardment with a flux density of $10^{10}$/second. The passage of a standard voltage of 1 volt through said rod gives a current reading of $1.00 \times 10^{-3}$ amperes under controlled conditions without any neutron bombardment and a reading of $1.16 \times 10^{-3}$ amperes when subjected to neutron bombardment with a flux of $10^{10}$/second.

Example 23

A rod of boron phosphide having the formula $B_{100}P$ and having a resistance of $10^3$ ohms is subjected to an electron bombardment with a flux density of $10^{10}$/second. A passage of a standard voltage of 1 volt through said rod gives a current reading of $1.00 \times 10^{-3}$ amperes under controlled conditions. The passage of an electron density of $10^{10}$/second gives a reading of $1.16 \times 10^{-3}$ amperes.

Example 24

A rod of boron phosphide having the formula $B_{100}P$ and having a resistance of $10^3$ ohms is subjected to an alpha-particle bombardment with a flux density of $10^8$/second. A passage of a standard voltage of 1 volt through said rod gives a current reading of $1.00 \times 10^{-3}$ amperes under controlled conditions without any alpha-particle bombardment and a reading of $1.16 \times 10^{-3}$ amperes when subjected to alpha-particle bombardment with a flux of $10^8$/second.

Example 25

A rod of boron phosphide having the formula $B_{100}P$ and having a resistance of $10^3$ ohms is subjected to a deuteron bombardment with a flux density of $10^8$/second. A passage of a standard voltage of 1 volt through said rod gives a current reading of $1.00 \times 10^{-3}$ amperes under controlled conditions without any deuteron bombardment and a reading of $1.16 \times 10^{-3}$ amperes when subjected to deuteron bombardment with a flux of $10^8$/second.

Example 26

A rod of boron phosphide having the formula $B_{100}P$ having a resistance of $10^3$ ohms is subjected to a gamma-ray bombardment with a flux density of $10^{12}$/second. The passage of a standard voltage of 1 volt through said rod gives a current reading of $1.00 \times 10^{-3}$ amperes under controlled conditions without any gamma-ray bombardment and a reading of $1.16 \times 10^{-3}$ amperes when subjected to gamma-ray bombardment with a flux of $10^{12}$/second.

It will be understood that modifications may be made in the structure of the detection devices without departing from the spirit and scope of this invention. For example, in FIG. 4 and 5 conductors 16 and 23, respectively, may be reduced in size to a mere fraction of the surface of the boron phosphide component with a corresponding reduction in the area of the P-N junction on the surface of the component. Similar modifications will be apparent to those skilled in the art.

What is claimed is:

1. A device for the detection and measurement of radiation, particles and neutrons comprising as a sensing element therein a crystalline boron phosphide having a boron-to-phosphorus ratio of at least 6 to 1 which gives a varying resistance in accordance with the radiation, particle and neutron flux to which the said sensing element is subjected, high melting point conductors attached to said sensing element and making ohmic contact therewith, and electrical leads attached to said conductors and associated circuitry.

2. A neutron detecting device comprising as a sensing element therein a crystalline boron phosphide having a boron-to-phosphorus ratio of at least 6 to 1 which gives a varying resistance in accordance with the neutron flux to which said sensing element is subjected, high melting point conductors attached to said sensing element and making ohmic contact therewith, electrical leads attached to said conductors and associated circuitry.

3. A neutron detecting device comprising as a sensing element therein a crystalline hexaboron phosphide having the formula $B_6P$ which gives a varying resistance in accordance with the neutron flux to which said $B_6P$ is subjected, high melting point conductors attached to said $B_6P$ and making ohmic contact therewith, electrical leads attached to said conductors and associated circuitry.

4. A neutron detecting device comprising as a sensing element therein crystalline boron phosphide having the formula $B_{20}P$ which gives a varying resistance in accordance with the neutron flux to which said $B_{20}P$ is subjected, high melting point conductors attached to said $B_{20}P$ and making ohmic contact therewith, electrical leads attached to said conductors and associated circuitry.

5. A neutron detecting device comprising as a sensing element therein crystalline boron phosphide having the formula $B_{40}P$ which gives a varying resistance in accordance with the neutron flux to which said $B_{40}P$ is subjected, high melting point conductors attached to said $B_{40}P$ and making ohmic contact therewith, electrical leads attached to said conductors and associated circuitry.

6. A neutron detecting device comprising as a sensing element therein crystalline boron phosphide having the formula $B_{70}P$ which gives a varying resistance in accordance with the neutron flux to which said $B_{70}P$ is subjected, high melting point conductors attached to said $B_{70}P$ and making ohmic contact therewith, electrical leads attached to said conductors and associated circuitry.

7. A neutron detecting device comprising as a sensing element therein crystalline boron phosphide having the formula $B_{100}P$ which gives a varying resistance in accordance with the neutron flux to which said $B_{100}P$ is subjected, high melting point conductors attached to said $B_{100}P$ and making ohmic contact therewith, electrical leads attached to said conductors and associated circuitry.

8. A device for the detection and measurement of radiation, particles and neutrons comprising as a sensing element therein a crystalline boron phosphide of N-type conductivity having a boron-to-phosphorus ratio of at least 6 to 1 and which gives a varying resistance in according with radiation, particle and neutron flux to which said sensing element is subjected, a first high melting point conductor attached to and being of the same conductivity type as said sensing element and making ohmic contact therewith, a second high melting point conductor attached to and making ohmic contact with said sensing element and having opposite conductivity characteristics thereby forming a P-N junction with said sensing element, electrical leads attached to said high melting point conductors and associated circuitry.

9. A neutron detecting device comprising as a sensing element therein a crystalline hexaboron phosphide of N-type conductivity having the formula $B_6P$ which gives varying resistance in accordance with the neutron flux to which said $B_6P$ is subjected, a first high melting point conductor attached to and being of the same conductivity type as said $B_6P$ and making ohmic contact therewith, a second high melting point conductor attached to and making ohmic contact with said $B_6P$ and having opposite conductivity characteristics thereby forming a P-N junction with said $B_6P$, electrical leads attached to said high melting point conductors and associated circuitry.

10. A neutron detecting device comprising as a sensing element therein a crystalline boron phosphide of N-type conductivity having the formula $B_{20}P$ which gives varying resistance in accordance with the neutron flux to which said $B_{20}P$ is subjected, a first high melting point conductor attached to and being of the same conductivity type as said $B_{20}P$ and making ohmic contact therewith, a second high melting point conductor attached to and making ohmic contact with said $B_{20}P$ and having opposite conductivity characteristics thereby forming a P-N junction with said $B_{20}P$ and the electrical leads attached to said high melting point conductors and associated circuitry.

11. A neutron detecting device comprising as a sensing element therein a crystalline boron phosphide of N-type conductivity having the formula $B_{40}P$ which gives varying resistance in accordance with the neutron flux to which said $B_{40}P$ is subjected, a first high melting point conductor attached to and being of the same conductivity type as said $B_{40}P$ and making ohmic contact therewith, a second high melting point conductor attached to and making ohmic contact with said $B_{40}P$ and having opposite conductivity characteristics thereby forming a P-N junction with said $B_{40}P$ and the electrical leads attached to said high melting point conductors and associated circuitry.

12. A neutron detecting device comprising as a sensing element therein a crystalline boron phosphide of N-type conductivity having the formula $B_{70}P$ which gives varying resistance in accordance with the neutron flux to which said $B_{70}P$ is subjected, a first high melting point conductor attached to and being of the same conductivity type as said $B_{70}P$ and making ohmic contact therewith, a second high melting point conductor attached to and making ohmic contact with said $B_{70}P$ and having opposite conductivity characteristics thereby forming a P-N junction with said $B_{70}P$ and the electrical leads attached to said high melting point conductors and associated circuitry.

13. A neutron detecting device comprising as a sensing element therein a crystalline boron phosphide of N-type conductivity having the formula $B_{100}P$ which gives varying resistance in accordance with the neutron flux to which said $B_{100}P$ is subjected, a first high melting point conductor attached to and being of the same conductivity type as said $B_{100}P$ and making ohmic contact therewith, a second high melting point conductor attached to and making ohmic contact with said $B_{100}P$ and having opposite conductivity characteristics thereby forming P-N junction with the said $B_{100}P$ and the electrical leads attached to said high melting point conductors and associated circuitry.

14. A neutron detecting device comprising as a sensing element therein the crystalline hexaboron phosphide of P-type conductivity having the formula $B_6P$ which gives varying resistance in accordance with the neutron flux to which said $B_6P$ is subjected, a first high melting point conductor attached to and being of the same conductivity type as said $B_6P$ and making ohmic contact therewith, a second high melting point conductor attached to and making ohmic contact with said $B_6P$ and having opposite conductivity characteristics thereby forming an N-P junction with said $B_6P$, electrical leads attached to said high melting point conductors and associated circuitry.

15. A neutron detecting device comprising as a sensing element therein a crystalline boron phosphide of P-type conductivity having the formula $B_{20}P$ which gives varying resistance in accordance with the neutron flux to which said $B_{20}P$ is subjected, a first high melting point conductor attached to and being of the same conductivity type as said $B_{20}P$ and making ohmic contact therewith, a second high melting point conductor attached to and making ohmic contact with said $B_{20}P$ and having opposite conductivity characteristics thereby forming an N-P junction with said $B_{20}P$, electrical leads attached to said high melting point conductors and associated circuitry.

16. A neutron detecting device comprising as a sensing element therein a crystalline boron phosphide of P-type conductivity having the formula $B_{40}P$ which gives varying resistance in accordance with the neutron flux to which said $B_{40}P$ is subjected, a first high melting point conductor attached to and being of the same conductivity type as said $B_{40}P$ and making ohmic contact therewith, a second high melting point conductor attached to and making ohmic contact with said $B_{40}P$ and having opposite conductivity characteristics thereby forming an N-P junction with said $B_{40}P$, electrical leads attached to said high melting point conductors and associated circuitry.

17. A neutron detecting device comprising as a sensing element therein a crystalline boron phosphide of P-type conductivity having the formula $B_{70}P$ which gives varying resistance in accordance with the neutron flux to which said $B_{70}P$ is subjected, a first high melting point conductor attached to and being of the same conductivity type as said $B_{70}P$ and making ohmic contact therewith, a second high melting point conductor attached to and making ohmic contact with said $B_{70}P$ and having opposite conductivity characteristics thereby forming an N-P junction with said $B_{70}P$, electrical leads attached to said high melting point conductors and associated circuitry.

18. A neutron detecting device comprising as a sensing element therein a crystalline boron phosphide of P-type conductivity having the formula $B_{100}P$ which gives varying resistance in accordance with the neutron flux to which said $B_{100}P$ is subjected, a first high melting point conductor attached to and being of the same conductivity type as said $B_{100}P$ and making ohmic contact therewith, a second high melting point conductor attached to and making ohmic contact with said $B_{100}P$ and having opposite conductivity characteristics thereby forming an N-P junction with said $B_{100}P$, electrical leads attached to said high melting point conductors and associated circuitry.

References Cited in the file of this patent
UNITED STATES PATENTS
2,867,727    Welker et al. _____ Jan. 6, 1959

UNITED STATES PATENT OFFICE
CERTIFICATE OF CORRECTION

Patent No. 3,113,210　　　　　　　　　　　　　　December 3, 1963

Dale E. Hill

It is hereby certified that error appears in the above numbered patent requiring correction and that the said Letters Patent should read as corrected below.

Column 1, line 26, for "forms crystalline" read -- forms of crystalline --; column 4, line 70, for "the quartz container was located," read -- the quartz container in which the graphite container was located, --; column 7, line 16, for "41" read -- 14 --; column 11, lines 8 and 9, for "according" read -- accordance --.

Signed and sealed this 28th day of July 1964.

(SEAL)

Attest:

ESTON G. JOHNSON
Attesting Officer

EDWARD J. BRENNER
Commissioner of Patents